United States Patent

Abt

[15] 3,681,570

[45] Aug. 1, 1972

[54] METHOD AND APPARATUS FOR IDENTIFYING ARTICLES

[72] Inventor: Jurg Abt, Uster, Switzerland

[73] Assignee: Zellweger Ltd., Uster, Switzerland

[22] Filed: March 27, 1970

[21] Appl. No.: 23,410

[30] Foreign Application Priority Data

March 26, 1969 Switzerland..............4553/69

[52] U.S. Cl........235/61.7 R, 235/91 L, 235/61.11 E
[51] Int. Cl.......G06k 17/00, G06m 1/27, G06k 7/10
[58] Field of Search..........235/61.7 R, 61.7 B, 61.12, 235/61.9, 91.14, 61.12; 250/219 D; 340/149 A

[56] References Cited

UNITED STATES PATENTS

| | | | |
|---|---|---|---|
| 2,919,851 | 1/1960 | Otis | 235/61.9 R |
| 3,538,311 | 11/1970 | Weidmann | 235/61.11 D |
| 3,541,309 | 11/1970 | Cutter | 235/91 L |
| 2,083,947 | 6/1937 | Furber | 194/10 |
| 3,526,125 | 9/1970 | Gilford | 235/61.12 X |

*Primary Examiner*—Maynard R. Wilbur
*Assistant Examiner*—Robert M. Kilgore
*Attorney*—Kenyon & Kenyon Reilly Carr & Chapin

[57] ABSTRACT

The articles are delivered onto a reader which reads a code on the article and delivers an identifying signal to the computer. The article is then weighed in a measuring unit. The computer emits a signal to the store so as to release data associated with the received signal. The released data which represents a tolerance range is emitted to a comparator which also receives a signal from the measuring unit conforming to the weight of the article. The signal is then compared with the tolerance range. If the signal is in the range, the article is dispensed for packaging; if not, the article is recycled.

17 Claims, 1 Drawing Figure

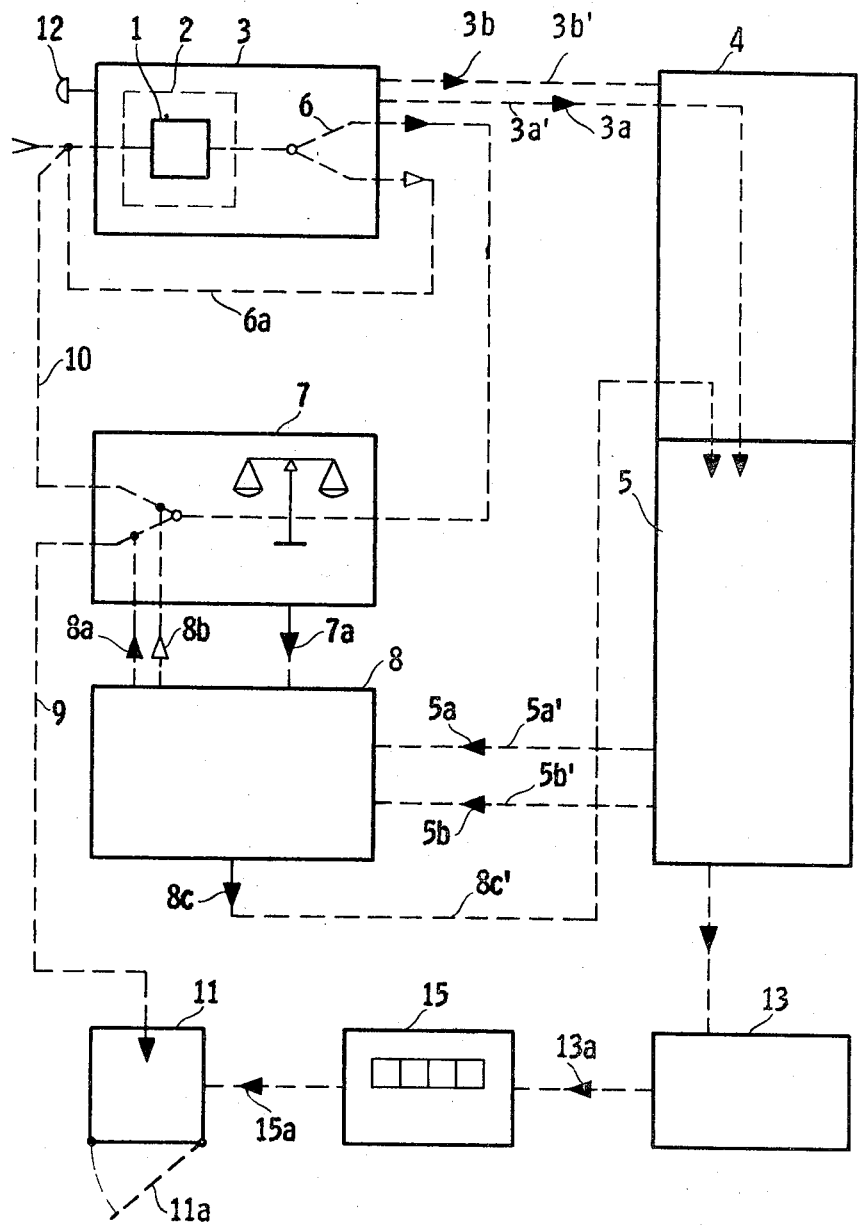

METHOD AND APPARATUS FOR IDENTIFYING ARTICLES

This invention relates to a method and apparatus for identifying articles.

Heretofore, it has been of considerable importance, for example, in the sale of goods and articles in self-service stores, in the distribution of goods from warehouses and the like, to quickly and reliably identify the articles bought by the customer or distributed from a warehouse. It is on the basis of this identification that cash slips, bills, delivery orders and so forth are prepared in the course of, e.g., clearing and/or store management.

As described in Swiss Pat. No. 460,400 articles that have not been specially distinguished for automatic identification have been identified through the measurement of physical properties. However, this has not been an all together satisfactory system and especially has not been fraud-proof. Also, other devices for automatically identifying articles such as described in Swiss Pat. No. 457,926 have been known.

Accordingly, it is an object of the invention to provide for a substantially fraud-proof system of identifying articles such as consumer goods.

It is another object of the invention to provide a reliable economic system of identifying articles.

Briefly, the invention is directed to a system in which each article to be identified carries a feature characteristic of the article and hence its number, for example, which can be read by a suitable reader as is known. Each article is also measured in a measuring unit in which at least one measureable property of the article is determined. The reading of the feature from the article serves to obtain further information in known manner for the further processing of the article. This information is temporarily stored until the measured result obtained by the measuring unit is compared with a tolerance range typical of the property measured in a suitable comparator. If the result supplied by the measuring unit falls in the tolerance range then the stored information derived from the reading of the feature on the article is released as the identification of the article. If the result is not within the tolerance range, the article is re-cycled.

The process of the invention requires the automatic reading of at least one feature of a given article to obtain information associated with that article and the releasing of this information as identification of the article only when at least one automatically effected measurement of at least one property of the article gives a result which lies within a tolerance range associated with the aforementioned information.

The apparatus of the invention comprises at least one reader to which are delivered articles carrying at least one feature which can be read off by the reader and which contains information typical of a given article, at least one measuring unit for measuring at least one property of the article to be identified, and a comparator which at its input end receives data from the measuring unit concerning the measured property as well as data from a store which is associated with the aforementioned information. The comparator compares the received data and derives an output signal therefrom which is transmitted to an evaluation unit for further processing of the identified article.

These and other objects and advantages of the invention will become more apparent from the following detailed description and appended claims taken in conjunction with the accompanying drawing in which:

The drawing illustrates a block diagram of an identification system according to the invention.

Referring to the drawing, an article 1 to be identified is delivered in sequence as in a row of articles directly or on a conveyor belt (not shown) into a readoff zone 2 of a receiving station of a reader 3. The article 1 is provided, for example, on at least one of its possible standing surfaces with a feature such as the article number itself and/or with an article marking in which the information typical of the article is contained in code. The reader 3 which serves to automatically read off the feature of the article 1 is of known construction and need not be further described. For example, readers for this purpose have been described in "Taschenbuch der Nachrichtenveranbeitung," K. Steinbuch 2nd Edition 1967, Springer-Verlag Berlin, Heidelberg, New York (Library of Congress Catalog Card Number 67–21079) pages 754 to 787; over fifty readers being listed in page 783. In operation, the reader 3 emits an output signal 3a which is derived from the reading of the feature on the article 1 and which is typical of the article number of the article 1. This output signal 3a is then transmitted via a suitable connection to a computer 4 of a evaluation unit which determines the associated article number from the output signal 3a in known manner. The article number determined is then temporarily stored in a store 5 of the evaluation unit along with other data associated with the article such as its price, various tolerance ranges as described below, and the like.

After the reading step has been carried out, the article 1 is delivered on a conveyor 6, for example, a conveyor belt, to a known type of measuring unit 7. This measuring unit 7 may be in the form of, for example, an automatic balance which is provided with its own conveyor belt and which takes the article 1 off the conveyor 6. For example, an automatic balance for weighing the article such as a Garvens Electronic High-Speed Checkweigher, or a Sartorius Electronische Präzisions — and Analysenwaegen, available with a digital readout, or a checkweighing system as described in "Chemical Processing", London, October 1967, page 82, can be used. Also, a measuring unit for the automatic dimensional inspection of an object as described in U.S. Pat. No. 3,365,699 issued Jan. 23, 1968 can be used. Such a measuring unit issues a measured result as an analog value which, as is known, can be converted to a digital result by a suitable analog-to-digital converter, e.g. as described in the above mentioned publication in pages 710 to 734 as well as in "Analog-Digital Conversion Handbook" (E-5100 7/64) by Barbera W. Stephenson Digital Equipment Corp., Maynard Mass. (1964). Further, a measuring unit for measuring color such as a Spectromat FS—2, Pretema, can be used. As the article 1 passes through the measuring unit 7, the weight of the article, for example, is measured. The result is then delivered to a comparator 8, for example, in the form of a digital signal 7a. Comparators for comparing the value of figures represented by digital signals are known, c.f. for example "DM7200/DM8200 four bit comparator" of the National Semiconductor Corp., 2975 San Ysidro Way, Santa Clara, Calif. 95051.

In addition, data stored in the store 5 relating to a tolerance range associated with the article number identified are delivered as is known to the comparator 8 for comparision with the result supplied by the measuring unit 7. These data are delivered, for example, in the form of digital signals 5a and 5b, to the comparator 8 through connections 5a' and 5b'. The comparator 8 includes suitable means (not shown) for comparing the signals from the measuring unit 7 and store 5 to determine whether or not the result supplied by the measuring unit 7 lies within the tolerance range as expressed by the signals 5a and 5b. If the result 7a does, a conveyor 9 is controlled by an output signal 8a from the comparator 8 in such a way that article 1 is taken by the conveyor 9 from the measuring unit 7 and carried to a container 11 at a delivery station. However, if the result 7a supplied by the measuring unit 7 does not lie in the aforementioned tolerance range, a conveyor 10 is controlled by an output signal 8b in such a way that the conveyor 10 returns the article 1 to the input of the reader 3. At the same time as the comparator shows approval, i.e. when the result 7a delivered by the measuring unit 7 to the comparator 8 lies within the aforementioned tolerance range, the comparator 8 also emits another output signal 8c through a connection 8c' to the computer 4 and the store 5 and the article number identified and stored in the store 5 is released as positive identification of the article 1. The sequence of the reading and measuring operations can, of course, also be reversed, or alternatively these operations may be carried out simultaneously in cases where a reader 3 is suitably combined with a measuring unit 7. Depending upon the sequence selected for reading and measuring, the results from reading and measuring have to be temporarily stored in intermediate stores for the next comparison in the comparator 4.

It is also possible, for example, to apply the article number to the articles to be identified in coded form, for example, drawn as a geometric pattern, and to read this off in known manner in order to obtain the output signal 3a.

It is also possible, however, to code the article numbers and to read them off in analogy to the leakage-protection methods with an automatic control known from the communications industry, (cf. for example Steinbuch, Taschenbuch der Nachrichtenverarbeitung, Verlag Springer, 2nd Edition, 1967, pages 850 to 854).

In the event of a faulty or unsuccessful reading, an unsuccessfully read article 1 would then be returned to the input of the reader 3 optionally by a conveyor 6a controlled by a fault-detecting system of this kind. This would entail the monitoring by the fault detecting system of the automatic reading of the feature of the article to detect the occurrence of a faulty reading during the reading operation.

However, the fault-detecting system referred to above may also be used to control a signalling arrangement, for example, in the form of a fluorescent screen (not shown), so that the customer can be asked, for example, to deliver the article to the reader 3 in a better way, i.e. in a position of greater advantage for reading purposes. To this end, the fault detecting system would cause a suitable signal to be emitted in response to a faulty reading so as to actuate the signalling arrangement.

The article number released by the output signal 8c of the comparator 8 in the computer-store arrangement can then be further evaluated as by calculation in an evaluation unit. For example, a total key 12 can be arranged in the reader 3 which the customer presses into the reader 3 after putting in all the articles he or she has purchased. In this way, the reader 3 transmits a signal 3b through a connection 3b' to the computer 4. The signal 3b orders the computer 4 to deliver the price information (also stored in the store 5) belonging to the article temporarily stored in the store 5 to a totalizer 13. This totalizer 13 then reports the total amount through a signal 13a, for example, to a cash register 15. This cash register 15 indicates the total, for example, and issues a bill. After payment has been made, a release flap 11a in the container 11 can be opened through a signal 15a so that the customer is able to remove the goods he or she has purchased.

In another embodiment of the invention, the price of the article 1 is directly determined by the aforementioned reading.

The identification of articles described in the foregoing can also be used for other purposes, for example, for the identification of articles taken from a storehouse in a factory.

The above described system of the invention is useful for automatically identifying different kinds of articles of the kind sold in a self-service store. For example, the information on prices associated with the individual article numbers can be delivered to a calculating unit on completion of the identification, i.e. after the information typical of the article, for example, its number, has been collected and successfully identified. The total amount to be paid at the cash desk for all the articles purchased by a customer can thus be automatically calculated and indicated. However, it is also possible for an account belonging to a given customer to be automatically debited with the aforementioned total.

It is also possible with known means to automatically obtain turnover figures, even separately for individual articles or groups of articles, on the basis of the completed identification of all the articles taken by the customer to and identified by the system.

What is claimed is:

1. A process for identifying each article of an arbitrary selection of different articles, each selection including a plurality of articles comprising the steps of;
   automatically reading off at least one feature of each article individually at a readoff zone to collect information associated with each article;
   temporarily storing the read information of each article individually as a provisional identification thereof;
   automatically obtaining a predetermined measureable physical property tolerance range corresponding to the provisional identification of each article from a store;
   automatically measuring at least one physical measureable property of each article individually to obtain a measured result of each article;
   automatically comparing the measured result of each measured article with the tolerance range corresponding to the provisional identification thereof;

thereafter individually releasing the provisional identification of each article in response to the measured result falling within the tolerance range therefor;

subsequently individually obtaining the price of each identified article corresponding to the provisional identification thereof from the store and adding the obtained prices of the identified articles to obtain a total price for the selection of articles; and automatically conveying each article individually to a container at a delivery station in response to said measured result falling in said tolerance range for subsequent removal.

2. A process as set forth in claim 1 wherein the article to be identified is delivered initially to at least one reader for reading at least one said feature and then to at least one measuring unit for measuring at least one said measurable property of the article.

3. A process as set forth in claim 1 wherein the measurable property of the article is initially measured and subsequently delivered to at least one reader for reading of at least one said feature of the article.

4. A process as claimed in claim 1 wherein the article is delivered to a combination of at least one reader with at least one measuring unit.

5. A process as claimed in claim 1 wherein the reading of at least one said feature is effected during at least one measurement of one measurable property.

6. A process as set forth in claim 1 which further comprises the steps of monitoring the automatic reading of the feature of the article to detect the occurrence of a faulty reading of the feature of the article during said step of reading.

7. A process as set forth in claim 6 which further comprises the step of rejecting the article in response to the occurrence of a faulty reading to prevent releasing of information associated with the article as identification thereof.

8. A process as set forth in claim 6 which further comprises the steps of emitting a signal in response to the occurrence of a faulty reading.

9. A process as set forth in claim 1 which further comprises the step of returning the article to the readoff zone in response to said measured result falling outside said tolerance range.

10. An apparatus for automatically identifying each of a plurality of articles of an arbitrary selection of different articles, each carrying at least one readable feature thereon containing information typical of the articles comprising at least one reader for receiving delivered articles in a readout zone thereof to read out the feature on each article and to emit a signal characteristic of said feature individually;

an evaluation unit including a store having data associated with each of the articles stored therein, said data including a predetermined tolerance range for a measureable physical property of each article, said store being connected to said reader to receive said signal therefrom to select the data associated with the article to be identified as a provisional identification thereof;

at least one measuring unit for measuring at least one measureable physical property of each article to be identified and emitting a signal corresponding to the measured property;

a comparator connected to said measuring unit to receive said measured property signal therefrom and to said store to receive a signal from said store corresponding to the tolerance range of the article provisionally identified, said comparator having means for comparing said signals and emitting an output signal in response to said measured property signal falling within said tolerance range signal from said store;

said comparator being further connected to said store to deliver said output signal to said store to release the selected data associated with each of the provisionally identified articles a container at a delivery station; and a conveyor between said measuring unit and said container for conveying each article to be identified individually to said container in response to said measured property signal falling in said tolerance range.

11. An apparatus as set forth in claim 10 further comprising a conveyor connecting said reader to said measuring unit to convey the provisionally identified article from said reader to said measuring unit.

12. An apparatus as set forth in claim 10 wherein said reader and said measuring unit are disposed in a functional unit.

13. An apparatus as set forth in claim 10 further comprising a fault detecting means connected to said reader for detecting the occurrence of a faulty reading by said reader of the article to be identified.

14. An apparatus as set forth in claim 13 wherein said fault detecting means includes a conveyor connected to said reader for returning the article to be identified to said reader for a further reading after exiting of the article therefrom.

15. An apparatus as set forth in claim 13 wherein said fault detecting means includes a signalling arrangement for indicating a faulty reading by said reader.

16. An apparatus as set forth in claim 10 which further comprises a cash register connected to said store for receiving the price of an identified article from the data associated with the article in response to said output signal being emitted from said comparator.

17. An apparatus as set forth in claim 10 further comprising a conveyor between said measuring unit and said reader for returning the articles to be identified to said reader in response to said measured property signal falling outside said tolerance range.

* * * * *